UNITED STATES PATENT OFFICE.

ARMIN GROB, OF BASEL, SWITZERLAND, ASSIGNOR TO THE FIRM OF BASLE CHEMICAL WORKS, OF BASEL, SWITZERLAND.

RED VAT-DYE AND PROCESS OF MAKING SAME.

No. 891,690.

Specification of Letters Patent.

Patented June 23, 1908.

Application filed January 10, 1908. Serial No. 410,140.

*To all whom it may concern:*

Be it known that I, ARMIN GROB, a citizen of the Swiss Republic, and resident of Basel, Switzerland, have invented a new Red Vat-Dyestuff and a Process of Making Same, of which the following is a full, clear, and exact specification.

I have found that by reacting with acenaphthene-quinone upon 3-oxy-1-thionaphthene a new yellow-red vat-dyestuff is obtained. In this reaction the 3-oxy-1-thionaphthene can be produced in the reaction mass itself by heating phenyl-thio-glycol-ortho-carboxylic acid with the acenaphthene-quinone employed. The said reaction can further be carried out in the presence or not of a dissolvent or a condensing agent, such as naphthalene, acetic anhydrid and sodium acetate, or likewise in an alcoholic solution or suspension with a condensing agent, such as an alkali or a secondary amin.

The manufacture of the new dyestuff is explained by the following examples:

Example I. 18.2 parts of acenaphthene-quinone, 21.2 parts of phenyl-thio-glycol-ortho-carboxylic acid, 3 parts of sodium acetate and 100 to 300 parts of acetic anhydrid are heated for some time to ebullition in an apparatus with reflux condenser, whereby the dyestuff separates in the form of small orange-red crystals. The latter are isolated by filtration and after washing with alcohol, further purified by their recrystallization from much boiling glacial acetic acid or benzene, or by dissolving the same in concentrated sulfuric acid and precipitating the dyestuff by an addition of water.

Example II. 18.2 parts of acenaphthene-quinone and 21.2 parts of phenyl-thio-glycol-ortho-carboxylic acid are heated, while stirring, to 230–250° centigrade (temperature of the oil bath), until the separation of water ceases. The red melt is powdered and recrystallized from much boiling glacial acetic acid or benzene or dissolved in concentrated sulfuric acid and precipitated by means of water.

Example III. 18.2 parts of acenaphthene-quinone and 15 parts of 3-oxy-1-thio-naphthene are suspended in 400 parts of alcohol of 90 per cent., then mixed and heated with 1 part of calcinated soda or a trace of piperidin. The dyestuff at once separates in red flakes. In the examples I and II the phenyl-thio-glycol-ortho-carboxylic acid employed is during the heating of the reaction mass transformed intermediary into 3-oxy-1-thionaphthene. The dyestuff obtained according to the three examples is soluble in hot glacial acetic acid or benzene. When cooling, it separates from its solutions as a crystalline powder of yellow to brown-red color. It is little soluble in alcohol. The red-orange colored solution of the dyestuff in benzene shows a light-brown fluorescence.

The dyestuff contains sulfur. Found 9.85 and 9.83 per cent. of sulfur. Calculated for

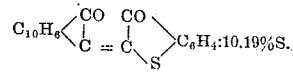

The dyestuff is soluble in cold concentrated sulfuric acid with a grass-green color and on addition of water is precipitated therefrom as brick-red flakes. On being heated with concentrated sulfuric acid or stirred with fuming sulfuric acid, the dyestuff is converted into sulfo-acids soluble in water and alkali. These sulfo-acids are likewise obtained by treating the mixture of acenaphthene-quinone and phenyl-thio-glycol-ortho-carboxylic acid with sulfuric acid. In the slightly acid solutions of these sulfo-acids wool is dyed in brick-red shades.

On treatment in slightly alkaline, aqueous suspension with sodium hydrosulfite or with sodium sulfid, at the ordinary temperature, or more rapidly by heating up to 50° centigrade, the dyestuff is reduced to a violet vat. From this vat cotton is dyed at first in violet shades, passing over red-brown to yellow-red on contact with the air.

What I claim is:

1. The described process for the manufacture of a red vat-dyestuff consisting in heating acenaphthene-quinone with 3-oxy-1-thio-naphthene.

2. The described process for the manufacture of a red vat dyestuff, consisting in heating acenaphthene-quinone with phenyl-thio-glycol-ortho-carboxylic acid, this latter being intermediary transformed into 3-oxy-1-thio-naphthene which reacts upon the acenaphthene-quinone.

3. The described process for the manufacture of a red vat-dyestuff, consisting in heating acenaphthene-quinone with phenyl-thio-glycol-ortho-carboxylic acid in presence of a condensing agent.

4. The described process for the manufacture of a red vat-dyestuff consisting in boiling acenaphthene-quinone with phenyl-thio-glycol-ortho-carboxylic acid and acetic anhydrid.

5. The described process for the manufacture of a red vat-dyestuff consisting in boiling acenaphthene-quinone with phenyl-thio-glycol-ortho-carboxylic acid, acetic anhydrid and sodium acetate.

6. As a new article of manufacture, the herein described yellow red vat-dyestuff derived from acenaphthene-quinone and 3-oxy-1-thio-naphthene, soluble in hot glacial acetic acid and in hot benzene, sparingly soluble in alcohol, soluble in concentrated sulfuric acid with a greeen color and dyeing cotton from a reduced alkaline vat in violet shades turning to yellow-red on contact with the air.

In witness whereof I have hereunto signed my name this 31 day of December 1907, in the presence of two subscribing witnesses.

ARMIN GROB.

Witnesses:
GEO. GIFFORD,
AMAND RITTER.